United States Patent [19]
Matty et al.

[11] Patent Number: 4,969,965
[45] Date of Patent: Nov. 13, 1990

[54] USING A CONTOURED HEAD FOR SEALING LIDDING STOCK

[75] Inventors: Jeffrey T. Matty, Holiday Park; Theodore P. Scanga, Lower Burrell; Ann T. Smith, New Kensington, all of Pa.

[73] Assignee: Aluminum Company of America, Pittsburgh, Pa.

[21] Appl. No.: 374,765

[22] Filed: Jul. 3, 1989

[51] Int. Cl.$^5$ .............................................. B32B 31/20
[52] U.S. Cl. ...................................... 156/69; 156/220; 156/273.9; 156/583.4; 220/359; 229/123.1
[58] Field of Search .............. 156/69, 219, 220, 273.9, 156/583.4; 220/359; 229/123.1

[56] References Cited

U.S. PATENT DOCUMENTS

| | | | |
|---|---|---|---|
| 3,701,699 | 10/1972 | Jackson | 156/69 |
| 4,689,099 | 8/1987 | Ito et al. | 156/69 |
| 4,761,197 | 8/1988 | Christine et al. | 156/583.4 X |

Primary Examiner—Robert A. Dawson
Attorney, Agent, or Firm—Elroy Strickland

[57] ABSTRACT

A method and plate structure for peelably sealing lidding stock to a sealing flange of a container. The plate structure has a face portion that is configured in cross section to contact the lidding stock and force the same against the flange surface without cutting the sealing layer of the stock and in a manner that indents the stock and flange, and retains sealing material in a sealing area to effect a good but peelable seal between the lidding stock and flange. The face portion includes an indentor made of a material of high thermal conductivity relative to the material of the remainder of the plate structure.

6 Claims, 3 Drawing Sheets

USING A CONTOURED HEAD FOR SEALING LIDDING STOCK

BACKGROUND OF THE INVENTION

The present invention relates to the sealing of lidding stock to the flange of an open ended container in a manner that permits peeling of the stock from the flange. (Lidding stock is generally a multi-layered sheet of material provided with a sealing coating, layer or film.) More particularly, the invention is directed to a head or plate structure for heat sealing lidding stock to a container flange.

Lidding stock is sealed to a container flange by a plate or ring means that applies heat and contact pressure to the lidding stock and flange. The plate or ring, in plan view, has a peripheral face of the general shape and size of the flange so that when the face is forced against the stock the sealing layer of the stock will soften the entire distance around the flange and adhere to the flange surface to form an effective seal between the stock and flange. The peripheral, sealing face of the plate or ring extends in a direction perpendicular to the plane of the plate or ring.

In sealing lidding material to the flange of a container, it is desirable that the head or plate structure that effects the seal soften and indent the flange to form a more effective seal. However, head structures presently in use and designed to effect indentation of the container flange employ an indentor that forces the sealing layer of the lidding stock outwardly from the sealing area beneath the indentor and, similarly moves the softened (molten) flange material from the sealing area, as explained in detail hereinafter, in effect cutting through the sealing film, as it is pressed against the container flange. When the consumer attempts to peel back the lid from the flange, the sealing material of the stock tends to remain intact on the container, at least in part, while the lid is removed. The reason for this is explained below. The manufacturers and suppliers of packaged items using lidding stock require the entire seal to be removable from the flange.

As explained hereinafter, the problem with heat sealing techniques currently in use is that they do not care for the rheology of the heat sealing and container material and the non-uniformity of heat transfer involved in the sealing process. (Rheology refers to the manner in which materials deform.)

BRIEF SUMMARY OF THE INVENTION

The present invention is directed to a plate structure that seals lidding stock to a container flange in a manner that controls the profile of heat and contact pressure to minimize the flow of sealing and flange material from the sealing area. This is effected by a special contoured face and edge portion of the plate structure. The contoured face and edge includes an indentor section that protrudes slightly from the plane and face of the remaining body of the edge portion, the remaining body having flat faces or curved recesses located on each side of the indentor section. The indentor section is effective to soften the container flange by the application of heat and permanently indent the same while the flat or recessed faces control penetration of the indentor and limit the application of contact pressure. The effect of limiting contact pressure is that the flow of both the sealing layer of a lidding stock and the molten portion of a container flange out of the sealed area is controlled.

The benefits of this method are realized when using either conduction heat or induction heating of the lidding stock if the stock contains metallic foil. In either case, a robust, peelable seal is made between the lidding stock and the flange.

In another embodiment of the invention, the head is bimetallic, with the indentor section of the sealing edge and face being made of a material having high thermal conductivity while the remaining structure of the head is made of a material having substantially lower thermal conductivity. The low thermal conductivity portion of the sealing face provides less heat transfer from the plate to the lidding stock at the areas of the seal adjacent the indentor. This provides lower effective temperatures and thus increased viscosity of the sealing layer under the flat or recessed faces of the plate adjacent to the indentor. The net effect of this "differential heat transfer" technique is that control of material flow is enhanced.

The embodiment of the invention employing recesses on each side of the indentor, as opposed to the flat configuration, offers superior mechanical resistance to abuse of the seal in a manner explained in detail below.

THE DRAWINGS

The invention, with its objectives and advantages, will be best understood from consideration of the following detailed description in combination with the accompanying drawings in which.

PREFERRED EMBODIMENTS

Figure 1:
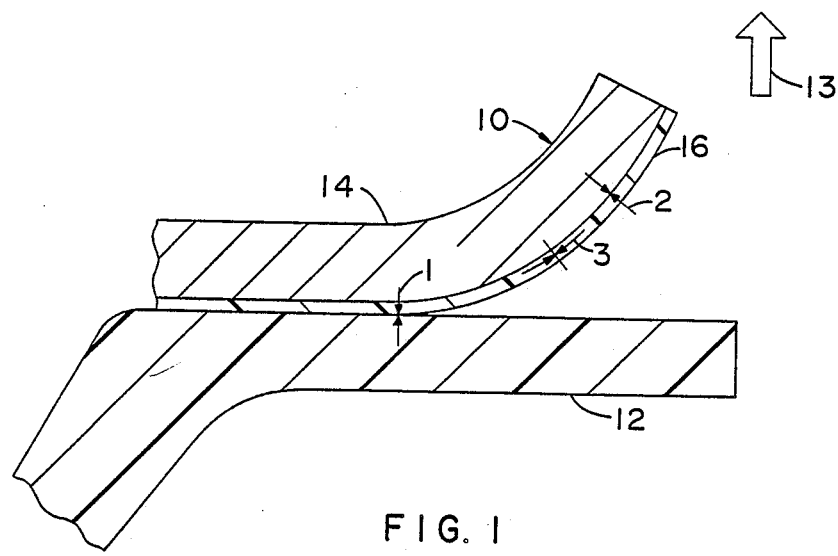
FIG. 1 is an enlarged partial section of a container flange and lidding stock, with the lidding stock being peeled from the flange.

Referring now to FIG. 1 of the drawings, FIG. 1 shows the process of peeling lidding stock 10 from a flange 12 of a container (not otherwise visible in FIG. 1). Arrow 13 in FIG. 1 shows the general direction of peel. Lidding stock is comprised of an upper or outer layer 14 supporting a lower, inner layer of sealing material 16, such as a suitable organic polymer adhesive. The material of supporting layer 14 can be a metal foil, such as aluminum or an aluminum alloy, or other suitable material, such as an organic polymer. Such a polymer should be relatively strong and able to retain its mechanical integrity at sealing temperatures. The material of the container and flange 12 can include, but is not limited to, polypropylene or a high density polyethelene. Further, the container can be single layered, as shown in certain of the figures, or multi-layered. A barrier layer may be one of the layers of a multi-layered construction.

There are several binding forces active in the peel of lidding stock that has been heat and pressure sealed to a container surface. The first of these is the adhesion of the sealing layer 16 of the lidding stock 10 to the container. This is indicated by opposing arrows 1 in FIG. 1 located at the interface between the sealing layer 16 and the flange 12. The second force is the adhesion of the sealing layer to the foil outer layer 14 of the stock, this being shown by opposing arrows 2 located at the interface between the outer layer and the sealing layer. A third force involved in the peeling process stems from the tensile strength of the sealing layer itself. This is shown by a curved line 3 in FIG. 1, which line extends lengthwise of the layer. Forces 2 and 3 serve to assist sealing layer 16 to peel away from container flange 12. In practice, lids can be peeled from a container surface when force 1 is greater than force 2, evidently because the effect of tensile strength 3 of the sealing film, in addition to force 2, are able to overcome the force of 1.

Figure 2:
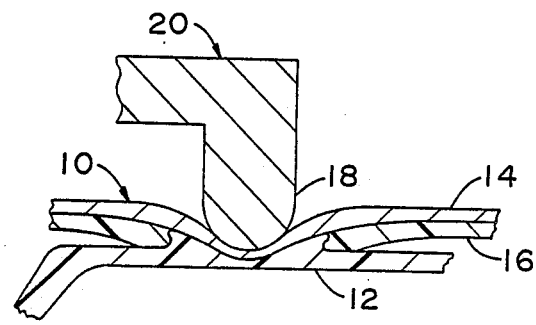
FIG. 2 is a partial view in section of a prior method of sealing lidding stock to a container flangé while forming an indentation in the container flange.
Figure 3:
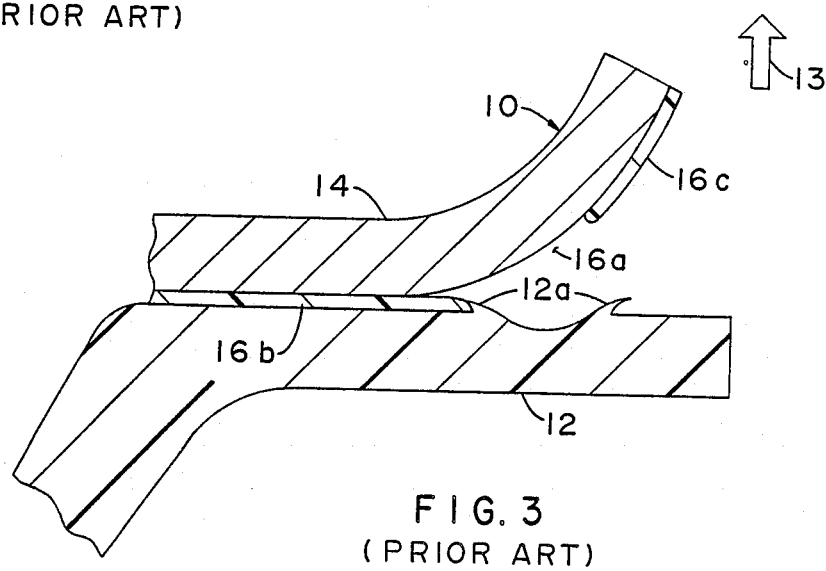
FIG. 3 is an enlarged partial section of a container flange and lidding stock suffering from the sealing method of FIG. 2 with the lidding stock being peeled from the flange.

FIG. 2 of the drawings depicts the problem discussed above in connection with a prior approach for indenting and sealing lidding stock 10 to a flange 12 of a container not otherwise depicted in FIG. 2. The prior method employed a somewhat narrow face 18 of a plate structure 20 to effect a seal between the lidding stock and flange by the application of pressure and heat via plate 20 and its face 18. (In sealing lidding stock to a container, appropriate amounts of heat and pressure are typically applied for a time period sufficient to effect the seal.) As shown in FIGS. 2 and 3, sealing material 16 is forced out of the sealing area between lidding stock 10 and container flange 12 by the indentor, such as face 18, to leave a gap 16a in sealing layer 16. Similarly, the flange portion beneath gap 16a, being molten, is forced outwardly from the seal area.

As shown further in FIG. 3, sealing film 16 is divided along foil 14 into sections 16b and c as the result of the sealing process described above in connection with FIG. 2. Further, in the process of forcing out sealing layer 16, the face of 18 indents flange 12 and produces outwardly facing protrusions 12a, the sharp ends of which form softened "pinning points" that receive the sealing material of layer 16 beneath such protrusions. When the lidding stock is subsequently pulled from the container flange, the pinning point, shown on the left in FIG. 3, mechanically holds sealing layer 16b of the stock to the flange, as does the adhesion force 1 (FIG. 1) between layer 16 and flange 12. Further, because of the gap 16a between sealing layers 16b and c, the tensile force 3 provided by a continuous sealing layer is not available for pulling a complete layer 16 from flange 12.

Figure 4:
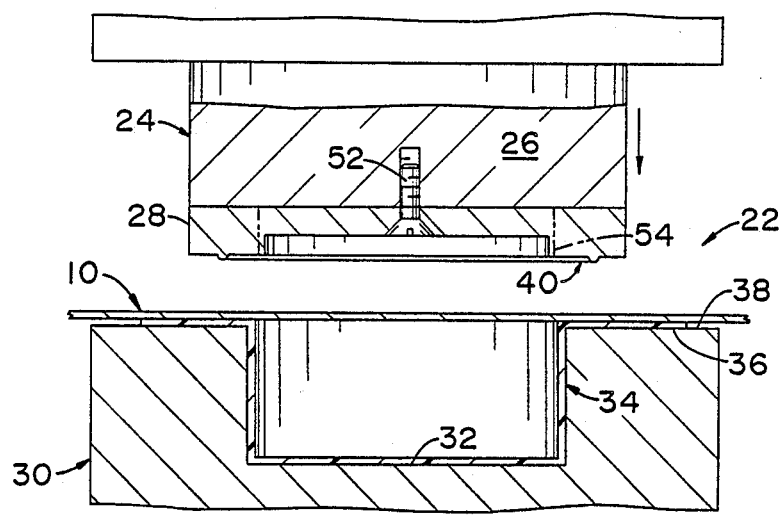
FIG. 4 is a partial sectional view of apparatus for sealing lidding stock to a flange of a container, the apparatus including the plate structure of the invention.

FIG. 4 of the drawings shows in cross section apparatus 22 for effecting a heat and pressure seal between a container flange and lidding stock. Apparatus 22 comprises an upper portion 24 that, in turn, includes a large heating block 26 adapted to support a plate 28 of the present invention, plate 28 performing a sealing process that does not suffer from the problems of FIGS. 2 and 3.

Beneath plate 28 is located a fixture 30 having a recess 32 for receiving a flanged container 34 to be sealed to lidding stock 10 in a peelable manner when the stock is disposed on a generally planar flange 36 of the container. (Flange 36 corresponds to flange 12 in FIGS. 1 to 3.) The fixture has a generally planar surface 38 located about recess 32 for supporting flange 36 against the force of plate 28 in the process of sealing the lidding stock to the flange.

A typical sealing process involves, first of all, heating block 26 to a temperature suitable to heat lidding stock 10 to a temperature at which sealing layer 16 will soften and stick to container flange 36 in a peelable manner. This can be accomplished by an electrical resistance heater (not shown) located inside of the block, though other internal or external heating means can be used.

The sealing process includes the steps of disposing a flanged container 34 in recess 32 of fixture 30. A sheet of the lidding stock 10 (or a lid cut to the breadth of flange 12) is located in the space between plate 28 and planar surface 38 of fixture 30, and disposed on flange 36 of the container. The upper portion 24 of apparatus 22 is now moved toward fixture 30, and a peripherally located face 40 of plate 28 presses the lidding stock and flange between the upper surface 38 of fixture 30 and face 40 of plate 28 about the circumference of the flange 36. The heat of block 26 is transferred to the lidding stock via plate 28 and its face 40. The heat and pressure is maintained for a time sufficient to effect a peelable seal between the stock and flange.

Figure 5:
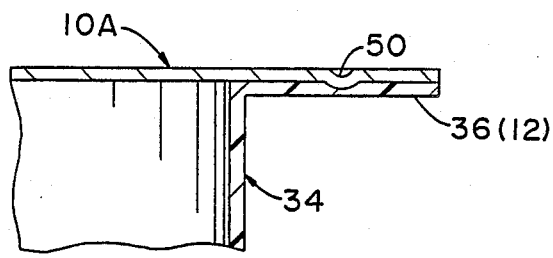
FIG. 5 is a partial sectional view showing lidding stock sealed to a container flange by the plate structure of the invention.

The configuration of face 40 in cross section (see FIGS. 6 to 9) is such that it indents stock 10 and flange at 50, as shown in FIG. 5, in the process of sealing the stock to flange 36. After the seal is made, and if pre-cut lids are not used, a cutting die (not shown) descends from the upper portion of apparatus 22 to sever outer peripheral portion of the sheet of lidding stock from that portion sealed to flange 36 and extending across the opening of container 34. In this manner, a peelable lid 10A (FIG. 5) is provided for the container. Lid 10A can also be pre-cut before it is sealed to a container flange.

Plate structure 28 avoids the problems discussed with the structure and method of FIG. 2. More particularly, plate 28 has a peripheral face or edge 40 that is effective to minimize the flow of sealing material from beneath the face of the plate and to prevent cutting of the sealing material. As shown in greater detail in FIGS. 6 to 9, sealing face 40 of plate 28 includes a narrow, rounded protrusion 44 and laterally disposed, inner and outer flat areas 46 (FIGS. 6 and 8) or, in the case of the embodiments of FIGS. 7 and 9, curved recess areas 48. The distance d (FIG. 6) between the tip of the protrusion 44 and the plane of the flat or recessed areas 46 or 48 is such that the indentor is an effective means for indenting both the lidding stock and flange, while the lateral face portions of 46 or 48 limit travel of the indentor, thereby preventing cutting of the sealing layer by simultaneously minimizing the flow of sealing and flange material from the area beneath the peripheral face of plate 28. This latter function is effected by the lateral faces 46 or 48.

With less heat, the viscosity of sealing material 16 and flange 12 is greater in the areas under faces 46 or 48 such that the materials do not flow in any substantial amount from the sealing area between the lidding stock and container flange, even though indentor 44 is able to indent at 50 (FIG. 5) the stock and flange.

Indentation 50 and the seal effected between the flange and stock extends in a line around the entire periphery of the flange to provide a seal that is completely peelable from the flange, thereby leaving the flange free of sealing material 16.

A typical force exerted by apparatus 22 on the lidding stock and flange is on the order of ten to thirty pounds per linear inch (or two to six kilograms per linear centimeter), which is dictated by the size of the container, depending upon the composition and gauge of the stock and flange. A typical temperature is on the order of 300 to 400 degrees F., with the force and temperature being applied for a time of say 0.5-1.5 seconds, again, depending upon the material and gauge of the flange and lidding stock.

Figure 6:
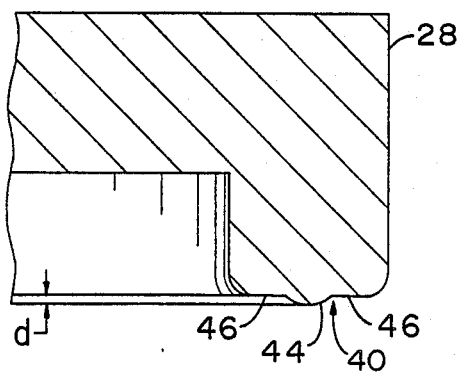
FIGS. 6 to 9 show respectively, in partial section, four alternative embodiments of the invention.
Figure 7:
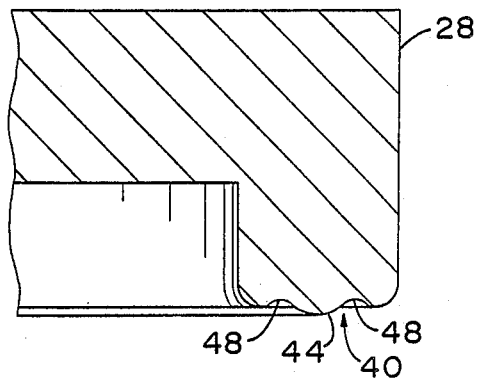
Figure 8:
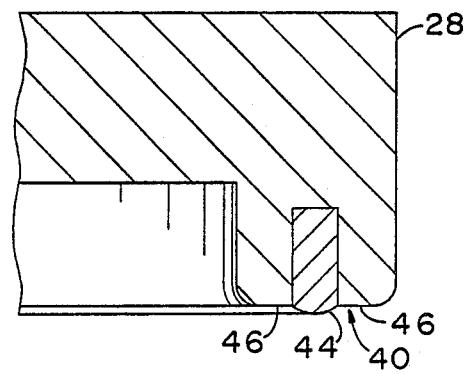
Figure 9:
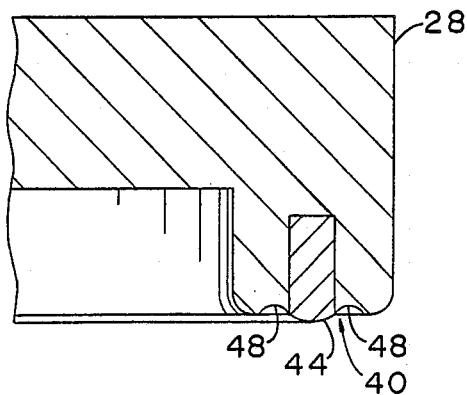

In the case of the recess areas 48 of the FIGS. 7 and 9 embodiments, the recesses allow more of sealing material 16 to flow from the area beneath the indentor than the flat areas 46 of FIGS. 6 and 8. However, the amount of flow, which is controlled by the ratio of the recess volume to indentor volume is such that additional flow, with respect to the FIG. 6 configuration, will not have a detrimental effect on peelability. The recesses, on the other hand, provide an advantage that the flat areas 46 do not, i.e., when lid 10A is pulled upwardly from flange 36, it is pulled under a tension force. However, when the lid material reaches indentation 50, the lid material now must move in the plane of the incline provided by the indentation so that the action and force of tensile pulling is converted to a shear action. This additional effort is helpful if the container is dropped or otherwise abused. With the recesses provided in the lid and flange by the structures of FIGS. 7 and 9, additional shear resistance to lid removal is provided, thereby increasing the resistance of the seal to abuse.

In the embodiments of FIGS. 8 and 9, the indentor 44 is made of a material different from the remaining body of seal plate 28, as indicated by the different cross hatching, i.e., the material of 44 has a coefficient of thermal conductivity substantially greater than that of the material of the plate itself, including the material adjacent planar and recessed areas 46 and 48. As a consequence, lateral faces 46 and 48 of the embodiments of FIGS. 8 and 9 will provide less heat to the areas along side the indentor 44, because of their lower thermal conductivity. Since less heat is input into the area under 46 or 48, the viscosity of the sealing layer 16 beneath 46 or 48 will be higher so that the flow of the sealing layer from the area beneath the indentor will be minimal.

A preferred range for the ratio's of the relative thermal conductivities of indentor 44 and plate body 28 is 5:1 to 15:1, though the effect of the bimetallic configuration will be more pronounced the higher the thermal conductivity of the indentor is in relation to material of 46 or 48.

As shown in FIG. 4, plate 28 is secured to block 26 by a suitable threaded fastener 52 inserted through an opening in the plate and threaded into a tapped opening provided in the block. The structure of plate 28, however, need not be solid, i.e., plate 28 can be an open ring, as indicated by phantom lines 54. In such a case, the ring would be provided with openings (not shown) to receive means for securing the ring to block 26.

In addition, the shape of the ring or plate, as well as that of the block, in plan view, is generally that of the container flange.

While the invention has been described in terms of preferred embodiments, the claims appended hereto are intended to encompass all embodiments which fall within the spirit of the invention.

What is claimed is:

1. A plate structure for peelably sealing lidding stock to a sealing area of a container, said lidding stock comprising a sheet of material having a layer of sealing material on one side of the sheet material,
    said plate structure having a peripheral face portion provided with a contoured configuration in cross section which includes an indentor that is effective to permanently indent the lidding stock and the flange of the container in the process of peelably sealing the lidding stock to the flange without cutting the sealing layer and preventing significant flow of sealing material from the sealing area,
    said indentor being made of a material of high thermal conductivity relative to the material of the remainder of plate and face portion and located in heat conducting relation with the material of said plate and face portion.

2. The structure of claim 1 in which the relative thermal conductivities of the indentor and remainder of the plate and face portion have a ratio in the range of 5:1 to 15:1.

3. A ring or plate structure for peelably sealing lidding stock to a container flange under appropriate heat, contact time and contact pressure conditions, said lidding stock being comprised of two or more layers, of which one layer constitutes a sealing layer of the lidding stock,
    said ring or plate structure having a continuous, peripheral face portion for contacting the lidding stock and forcing it against the container flange in a sealing area between the stock and flange,
    said face portion having an indentor made of relatively high thermal conductivity material relative to the remainder of the face portion,
    said face portion and indentor being effective to provide a continuous permanent indentation in the lidding stock and container flange in the process of peelably sealing the stock to the flange without cutting the sealing layer and minimizing the flow of the sealing layer from the sealing area such that tensile strength in the sealing layer is retained by maintaining an uninterrupted sealing layer along the distance of the peelable seal.

4. A method of peelably sealing lidding stock to a container surface, said stock including a layer of sealing material, the method comprising:
    providing a plate structure with a face portion having an indentor in intimate contact with said plate structure for permanently indenting the lidding stock and container surface in a sealing area,
    providing said indentor with a thermal conductivity that is substantially higher than the remaining portion of said plate structure and face portion,
    supporting the container surface on a rigid surface,
    locating said lidding stock relative to the container surface such that the sealing material contacts the container surface,
    contacting the surface of the lidding stock opposite the sealing layer with said indentor,
    heating the lidding stock and container at least in the sealing area,
    forcing the indentor into the lidding stock for a time sufficient to permanently indent the lidding stock and container, while the container surface is supported on said rigid surface, without cutting the sealing layer and without substantial displacement of the sealing material from the sealing area, and
    allowing the lidding stock and container surface to cool.

5. A method of claim 4 including
    heating the plate structure, and
    using the plate structure to heat the lidding stock and container surface.

6. The method of claim 4 including
    inducing eddy currents in the lidding stock, and
    utilizing said eddy currents to heat said stock and container.

* * * * *